US010767718B2

(12) United States Patent
Uffelman

(10) Patent No.: US 10,767,718 B2
(45) Date of Patent: Sep. 8, 2020

(54) ROTATIONAL COUPLING DEVICE WITH ARMATURE RELEASE COLLAR

(71) Applicant: Warner Electric Technology LLC, Braintree, MA (US)

(72) Inventor: Bradley Lyn Uffelman, Caro, MI (US)

(73) Assignee: Warner Electric Technology LLC, Braintree, MA (US)

( * ) Notice: Subject to any disclaimer, the term of this patent is extended or adjusted under 35 U.S.C. 154(b) by 44 days.

(21) Appl. No.: 16/247,667

(22) Filed: Jan. 15, 2019

(65) Prior Publication Data

US 2020/0224742 A1 Jul. 16, 2020

(51) Int. Cl.
| | |
|---|---|
| *F16D 67/06* | (2006.01) |
| *F16D 27/06* | (2006.01) |
| *F16D 48/06* | (2006.01) |
| *H02K 7/108* | (2006.01) |
| *H02K 7/102* | (2006.01) |
| *F16D 27/00* | (2006.01) |

(Continued)

(52) U.S. Cl.
CPC ............. *F16D 67/06* (2013.01); *F16D 27/06* (2013.01); *F16D 48/064* (2013.01); *H02K 7/1025* (2013.01); *H02K 7/1085* (2013.01); *F16D 27/004* (2013.01); *F16D 2027/002* (2013.01); *F16D 2121/22* (2013.01); *F16D 2129/065* (2013.01)

(58) Field of Classification Search
None
See application file for complete search history.

(56) References Cited

U.S. PATENT DOCUMENTS

| | | | |
|---|---|---|---|
| 2,899,037 A | 8/1959 | Pierce | |
| 3,512,618 A | 5/1970 | Schafer | |
| 3,642,104 A | 2/1972 | Schafer | |

(Continued)

FOREIGN PATENT DOCUMENTS

| | | |
|---|---|---|
| JP | 10-47383 A | 2/1998 |
| WO | 2015/000133 A1 | 1/2015 |

OTHER PUBLICATIONS

International Search Report issued in corresponding International (PCT) Application No. PCT/US2020/013593 (dated Apr. 7, 2020).

(Continued)

*Primary Examiner* — Mark A Manley
(74) *Attorney, Agent, or Firm* — Reising Ethington P.C.

(57) ABSTRACT

A rotational coupling device includes an armature configured for coupling to a shaft for rotation with the shaft about an axis, but axially movable relative to the shaft. An electromagnet assembly is disposed on one side of the armature and fixed against rotation. A collar is disposed on the opposite side of the armature. The collar is configured for rotation with the shaft, but fixed against axial movement relative to the shaft and includes a permanent magnet. When a current having a first polarity is provided to the electromagnet assembly, the armature moves in one axial direction into engagement with a member of the coupling device to transmit a torque between the member and the armature. The permanent magnet urges the armature in the opposite axial direction to disengage the armature from the member when the current is not provided to the electromagnet assembly.

12 Claims, 2 Drawing Sheets

(51) Int. Cl.
*F16D 129/06* (2012.01)
*F16D 121/22* (2012.01)

(56) References Cited

U.S. PATENT DOCUMENTS

| | | | | |
|---|---|---|---|---|
| 3,730,317 | A * | 5/1973 | Jaeschke | F16D 27/06 |
| | | | | 192/84.9 |
| 5,121,018 | A | 6/1992 | Oldakowski | |
| 5,847,478 | A | 12/1998 | Usui et al. | |
| 8,205,727 | B2 | 6/2012 | Berndt et al. | |
| 8,403,124 | B2 | 3/2013 | Dimig et al. | |
| 8,739,952 | B2 * | 6/2014 | Krafft | F16D 27/004 |
| | | | | 192/84.31 |
| 2006/0219497 | A1 | 10/2006 | Organek et al. | |
| 2006/0219498 | A1 | 10/2006 | Organek et al. | |
| 2009/0314600 | A1 * | 12/2009 | Kato | F16D 27/105 |
| | | | | 192/84.31 |

OTHER PUBLICATIONS

Written Opinion issued in corresponding International (PCT) Application No. PCT/US2020/013593 (dated Apr. 7, 2020).
English (machine) translation of JP H10-47383.
English (machine) translation of WO 2015/000133 A1.

* cited by examiner

ROTATIONAL COUPLING DEVICE WITH ARMATURE RELEASE COLLAR

BACKGROUND OF THE INVENTION a. Field of the Invention

This disclosure relates to a rotational coupling device. In particular, the instant disclosure relates to a rotational coupling device including a shaft mounted collar with permanent magnets that is used to release an armature from engagement with another member of the device.

b. Background Art

Rotational coupling devices such as brakes and clutches may use a variety of force transmitting mechanisms to cause movement of components of the coupling device to engage or disengage the device. In some conventional devices, an electromagnet is used to draw an armature into engagement with a stationary or rotating member of the device in order to, respectively, inhibit rotation or cause rotation of the armature and a corresponding structure to which the armature is connected (e.g., a shaft, pulley, gear, etc.). When it is desired to disengage the armature from the stationary or rotating member, another force transmitting mechanism such a spring moves the armature away from the member. These conventional devices typically work well for their intended purpose. The devices do have a significant drawback, however. When the electromagnet is deenergized, residual magnetism exists in the armature and the stationary or rotating member with which the armature is engaged. This residual magnetism delays release of the armature and causes undesirable friction/rubbing between the armature and the stationary or rotating member.

The inventors herein have recognized a need for a rotational coupling device that will minimize and/or eliminate one or more of the above-identified deficiencies.

BRIEF SUMMARY OF THE INVENTION

A rotational coupling device is provided. In particular, a rotational coupling device is provided including a shaft mounted collar with permanent magnets that is used to release an armature from engagement with another member of the device.

A rotational coupling device in accordance with one embodiment of the invention includes an armature configured for coupling to a shaft for rotation therewith about a rotational axis. The armature is configured for movement axially relative to the shaft. The device further includes an electromagnet assembly disposed on a first axial side of the armature and fixed against rotation relative to the rotational axis. The device further includes a collar disposed on a second axial side of the armature opposite the electromagnet assembly. The collar is configured for rotation with the shaft, but fixed against axial movement relative to the shaft. The collar includes a permanent magnet. The electromagnet assembly urges the armature in a first axial direction into engagement with a member of the coupling device to transmit a torque between the member and the armature when a current having a first polarity is provided to the electromagnet assembly. In one embodiment, the member may comprise the electromagnet assembly itself and the torque brakes rotation of the armature. In another embodiment, the member may comprise a rotor disposed axially between the armature and the electromagnet assembly and the torque results in rotation of both of the armature and the rotor. The permanent magnet urges the armature in a second axial direction to disengage the armature from the member when the current is not provided to the electromagnet assembly.

A rotational coupling device in accordance with another embodiment of the invention includes an armature configured for coupling to a shaft for rotation therewith about a rotational axis. The armature is configured for movement axially relative to the shaft. The device further includes an electromagnet assembly disposed on a first axial side of the armature and fixed against rotation relative to the rotational axis. The device further includes a collar disposed on a second axial side of the armature opposite the electromagnet assembly. The collar is configured for rotation with the shaft, but fixed against axial movement relative to the shaft. The collar includes a permanent magnet. The device further includes a controller configured to provide a current having a first polarity to the electromagnet assembly to establish an electromagnetic circuit between the armature and the electromagnet assembly and urge the armature in a first axial direction into engagement with a member of the coupling device to transmit a torque between the member and the armature. In one embodiment, the member may comprise the electromagnet assembly itself and the torque brakes rotation of the armature. In another embodiment, the member may comprise a rotor disposed axially between the armature and the electromagnet assembly and the torque results in rotation of both of the armature and the rotor. The controller is further configured to terminate the current to terminate the electromagnetic circuit between the armature and the electromagnet assembly. The permanent magnet urges the armature in a second axial direction following termination of the electromagnetic circuit to disengage the armature from the member.

A rotational coupling device in accordance with another embodiment of the invention includes an armature configured for coupling to a shaft for rotation therewith about a rotational axis. The armature is configured for movement axially relative to the shaft. The device further includes an electromagnet assembly disposed on a first axial side of the armature and fixed against rotation relative to the rotational axis. The device further includes a collar disposed on a second axial side of the armature opposite the electromagnet assembly. The collar is configured for rotation with the shaft, but fixed against axial movement relative to the shaft. The collar includes a permanent magnet. The electromagnet assembly urges the armature in a first axial direction into engagement with a member of the coupling device to transmit a torque between the member and the armature when a first current having a first polarity is provided to the electromagnet assembly. In one embodiment, the member may comprise the electromagnet assembly itself and the torque brakes rotation of the armature. In another embodiment, the member may comprise a rotor disposed axially between the armature and the electromagnet assembly and the torque results in rotation of both of the armature and the rotor. The permanent magnet urges the armature in a second axial direction to disengage the armature from the member when a second current having a second polarity is provided to the electromagnet assembly.

A rotational coupling device in accordance with the present teachings is advantageous relative to conventional rotational coupling device. In particular, the inventive device releases an armature mounted on a shaft from engagement with a stationary or rotating member using a collar with one or more permanent magnets that is mounted on the same shaft. The collar and magnets cause a rapid release of the armature that overcomes the residual magnetism in the armature and stationary or rotating member to reduce the release time and friction between the armature and member. The collar also eliminates the need for springs or other axial mechanical force transmitting mechanisms thereby reducing the number of moving parts in the coupling device and improving the life of the device.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
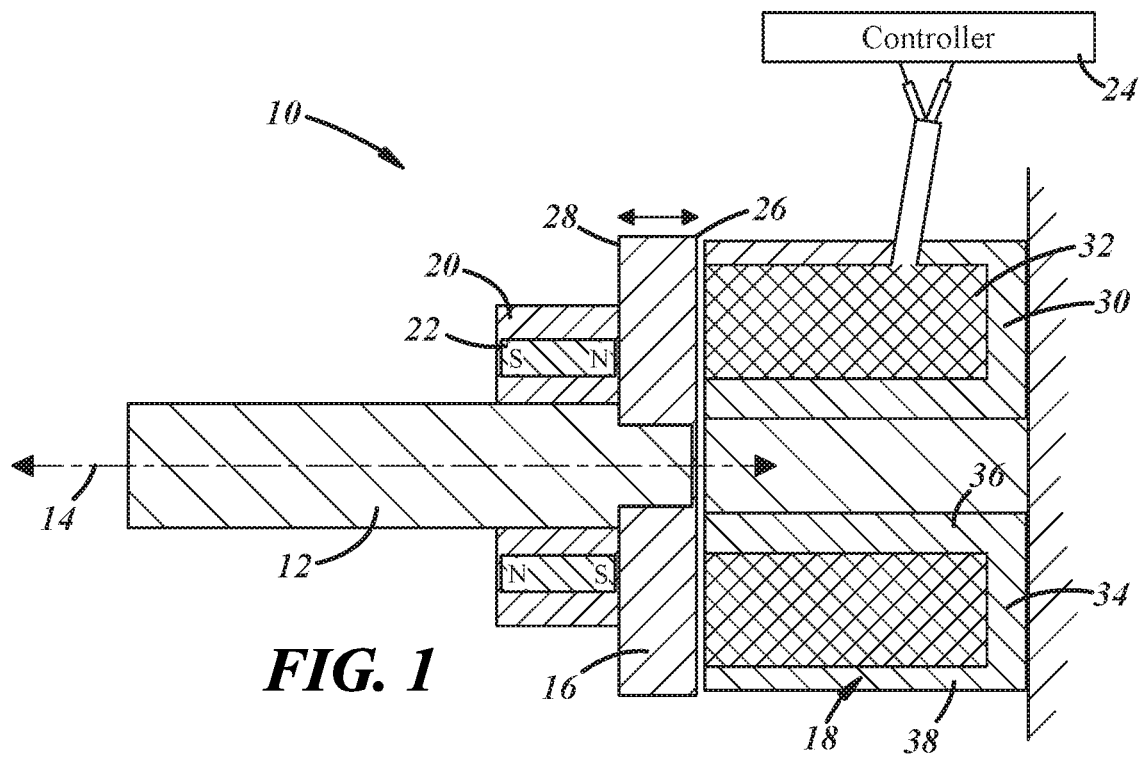
FIG. 1 is a diagrammatic, cross-sectional view of a rotational coupling device in accordance with one embodiment of the present invention.

Referring now to the drawings wherein like reference numerals are used to identify identical components in the various views, FIG. 1 illustrates a rotational coupling device 10 in accordance with one embodiment of the invention. Device 10 is configured to function as a brake and provides a braking torque to a shaft 12 (and any structure coupled to shaft 12 such a gear, pulley, blade, etc.) rotating about a rotational axis 14 in order to slow or halt rotation of shaft 12. It will be understood by those of ordinary skill in the art that device 10 may be used in a wide variety of industrial and other applications requiring a brake. Device 10 may include an armature 16, means, such as electromagnet assembly 18, for urging armature 16 in a first direction along axis 14, means, such as a collar 20 housing one or more permanent magnets 22, for urging armature 16 in a second axial direction along axis 14, and a controller 24.

Armature 16 is provided to transmit a braking torque to shaft 12. Armature 16 may be made from metals or metal alloys or other materials having relatively low magnetic reluctance such as iron or steel. In accordance with various embodiments, armature 16 is made from metal alloys having a relatively high carbon content such that that armature 16 has a relatively high remanence following exposure to electromagnetic fields. In accordance with certain embodiments, armature 16 is made from a material having a content of at least 0.35 percent by weight of carbon or a carbon equivalent (a "carbon equivalent" comprises a combination of carbon (C), manganese (Mn), chromium (Cr), molybdenum (Mo), vanadium (V), nickel (Ni) and copper (Cu) often represented by the formula CE=C+Mn/6+(Cr+Mo+V)/5+(Ni+Cu)/15). Armature 16 may be annular in shape and may be disposed about, and centered about, axis 14. Armature 16 is configured for coupling to shaft 12 for rotation therewith about axis 14, but is configured for movement axially relative to shaft 12. In particular, the radially outer surface of shaft 12 and the radially inner surface of armature 16 may have complementary, torque transmitting, shapes that fix armature 16 and shaft 12 against relative rotation, but permit relative axial movement including complementary splines, teeth or flats (e.g., a single or double D shape or hexagonal shape). Armature 16 includes friction surfaces on opposed sides 26, 28 configured to engage electromagnet assembly 18 and collar 20, respectively, during engagement and disengagement of the brake.

Electromagnet assembly 18 provides a means for urging armature 16 in one direction along axis 14 away from collar 20 and into engagement with assembly 18 to transmit a braking torque from assembly 18 to armature 16 and engage the brake. Assembly 18 is disposed on one axial side 26 of armature 16 opposite collar 20 and is fixed against rotation relative to axis 14. Assembly 18 includes a housing 30 or field shell and a conductor 32. Housing 30 provides structural support for, and orients, conductor 32. Housing 30 also forms part of an electromagnet circuit with armature 16 when current is supplied to conductor 32. Housing 30 may be annular in shape and disposed about, and centered about, axis 14. Housing 30 may be made from materials having a relatively low magnetic reluctance such as ferromagnetic materials including steel. In accordance with various embodiments, housing 30 may be made from metal alloys having a relatively high carbon content such that that housing 30 has a relatively high remanence following exposure to electromagnetic fields. In accordance with certain embodiments, housing 30 is made from a material having a content of at least 0.35 percent by weight of carbon or a carbon equivalent. Housing 30 may define a radially extending end wall 34 and axially extending, radially aligned, inner and outer walls 36, 38 (or poles) that extend axially from end wall 34 towards armature 16. Conductor 32 may comprise a conventional wound coil or similar conductor and is configured to be received within housing 30 between walls 36, 38. Current supplied to conductor 32 creates or weakens an electromagnetic circuit that includes armature 16 and housing 30 depending on the strength and polarity of the current and the current state of device 10 as discussed in greater detail below. The electromagnetic circuit urges armature 16 towards electromagnet assembly 18 and away from collar 20 against the magnetic forces of magnets 22 to engage brake 10.

Figure 3:
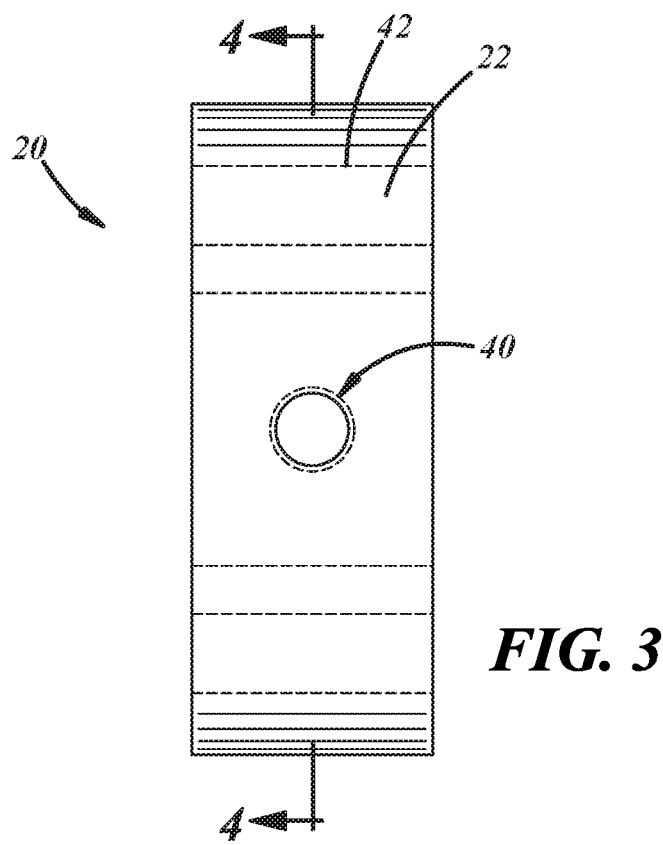
FIG. 3 is a side view of a collar of the rotational coupling devices in FIGS. 1-2.
Figure 4:
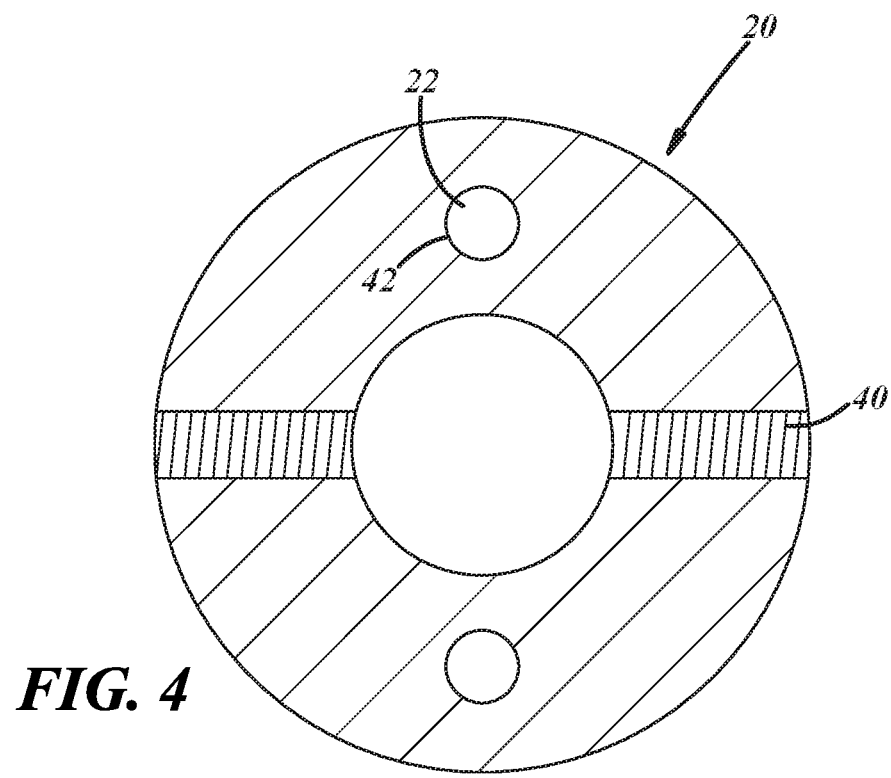
FIG. 4 is a cross-sectional view of the collar of FIG. 3 taken along lines 4-4.

Collar 20 and magnets 22 provide a means for urging armature 16 in the opposite direction along axis 14 towards collar 20 and away from electromagnet assembly 18 to disengage armature 16 from assembly 18 and release the brake. Collar 20 may be made from metals or metal alloys or other materials having a relatively high magnetic reluctance such as aluminum. Collar 20 is disposed on side 28 of armature 16 opposite electromagnet assembly 18. Collar 20 may be annular in shape and may be disposed about, and centered about, axis 14. Collar 20 is coupled to shaft 12 for rotation therewith and is also fixed against axial movement relative to shaft 12. Referring to FIGS. 3-4, in one embodiment, collar 20 includes one or more radially extending threaded bores 40 configured to receive set screws used to secure collar 20 to shaft 12. The bores 40 may be equally circumferentially spaced about collar 20 and axis 14. Collar 20 further includes one or more axially extending bores 42 configured to receive magnets 22. Bores 42 may also be equally circumferentially spaced about collar 20 and axis 14.

Referring again to FIG. 1, magnets 22 form part of a magnetic circuit with armature 16 that urges armature 16 away from electromagnet assembly 18 and towards collar 20 along axis 14 to release the brake. Magnets 22 comprise permanent magnets and may comprise neodymium iron boron (Nd—Fe—B) magnets or other known permanent magnets. Magnets 22 are arranged such that the poles of each magnet 22 are axially aligned. In the illustrated embodiment, collar 20 includes two magnets 22 with one magnet 22 having a pole having a first polarity (e.g., North) facing armature 16 and a pole having a second polarity (e.g., South) facing away from armature 16 while the other magnet 22 has a pole having the second polarity facing armature 16 and a pole having the first polarity facing away from armature 16. Although the illustrated embodiment includes two magnets 22, it should be understood that the number of magnets 22 may vary. In the illustrated embodiment, the two magnets 22 are located diametrically opposite one another within bores 42 of collar 20. In general, magnets 22 may be equally circumferentially spaced on collar 20 and about axis 14.

Controller 24 is provided to control the delivery of current to conductor 32 and, therefore, the operation of device 10. Controller 24 may comprise a programmable microprocessor or microcontroller or may comprise an application specific integrated circuit (ASIC). Controller 24 may include a central processing unit (CPU). Controller 24 may also include a memory and an input/output (I/O) interface through which controller 24 may receive a plurality of input signals and transmit a plurality of output signals. Controller 24 controls the delivery of current to conductor 32 from a power source (not shown) such as a battery or capacitor.

Controller 24 is configured to control the operation of device 10 by controlling the delivery of current to conductor 32 in order to apply and release the brake. In some embodiments, current may be delivered to conductor 32 continuously or for relatively long durations to engage the brake and maintain the brake in an engaged state. In other embodiments, device 10 may operate as a bistable brake in which short duration current pulses cause device 10 to move between engaged and disengaged states and to remain in a given state after the pulse ends until the next current pulse is provided to conductor 32. When device 10 is disengaged (i.e., when armature 16 is disengaged from housing 30 of electromagnet assembly 18 as a result of the magnetic forces generated by magnets 22), controller 24 may engage the brake by delivering a current having a first polarity to conductor 32. The current establishes an electromagnetic circuit including armature 16 and housing 30. In particular, the current generates a magnetomotive force in an amount equal to the number of turns (N) in the conductor 32 multiplied by the amount of current (I). The magnetomotive force generates a magnetic flux ($\phi$) that traverses the air gap between the armature 16 and housing 30 with the amount of flux ($\phi$) depending on the magnetic reluctance (R) in the electromagnetic circuit. The flux ($\phi$) in the electromagnetic circuit creates an attractive force (F) between the armature 16 and housing 30 opposing the magnetic forces of magnets 22 and that is a combination of forces at the inner and outer poles formed by walls 36, 38 of housing 30: $F=\phi^2/$(area of outer pole)$+\phi^2/$(area of inner pole). The amount of current (I) supplied must be sufficient to generate an attractive force (F) greater than the magnetic force of magnets 22 in order to urge armature 16 in an axial direction away from collar 20 and towards electromagnet assembly 18 to engage brake 10.

As noted above, in some embodiments device 10 may be configured to act as a bistable brake in which device 10 is configured to maintain an attractive force (F) that exceeds the magnetic force of magnets 22 even after the current is terminated. As discussed above, at least one of armature 16 and housing 30 may be made from a material having a relatively high carbon content. As a result, the armature 16 and housing 30 have a relatively high remanence that continues to exist even after current is no longer provided to conductor 32. Due to this remanence, a magnetic circuit among armature 16 and housing 30 is maintained after termination of the current and the brake remains in an engaged or applied state. In one embodiment, at least one of armature 16 and housing 30 has a content of at least 0.35 percent by weight of carbon or a carbon equivalent so as to have a relatively high remanence. The exact material composition of armature 16 and/or housing 30 may vary, however, based on other factors that influence the amount of attractive force between armature 16 and housing 30 such as the size of the air gap between armature 16 and housing 30 when the brake is disengaged and the area of the poles formed by the inner and outer walls 36, 38 of housing 30. Further, the material composition may be chosen in consideration with other factors that influence residual magnetism including annealing, mechanical stresses (e.g., coining) and heat treatment of materials. In general, the material for armature 16 and/or housing 30 is selected so as to produce a residual attractive force between armature 16 and housing 30 that exceeds the magnetic force of magnets 22 when considering these other factors.

When it is desired to disengage or release the brake, controller 24 may simply terminate delivery of the current to conductor 32. Alternatively, in the case of the bi-stable brake wherein armature 16 and housing 30 have a relatively high remanence, controller 24 may provide current to conductor 32 having a polarity that is opposite the polarity of the current used to engage device 10. This current again generates a magnetomotive force in an amount equal to the number of turns (N) in the conductor 32 multiplied by the amount of current (I), but this magnetomotive force operates in a direction opposite the force generated by the current used to engage device 10. This coercive magnetomotive force reduces the residual magnetic flux ($\phi$) traversing the air gap between the armature 16 and housing 30. As a result, the current weakens the magnetic circuit among armature 16 and housing 30 thereby allowing magnets 22 to move armature 16 along axis 14 away from electromagnet assembly 18 and towards collar 20 to disengage device 10. Because the magnetic force of magnets 22 moves armature 16 during disengagement of device 10, the current used to disengage device 10 may have a magnitude that is less than the magnitude of the current used to engage device 10 (in which the force exerted by magnets 22 must be overcome). Further, the amount of current required to disengage or release device 10 may be minimized by considering the size of the air gap between armature 16 and housing 30. In particular, the existence of the air gap also opposes the residual attractive force between armature 16 and housing 30. In a graph of a conventional demagnetization curve, an air gap line can be plotted in the second quadrant of the graph from the origin and with a slope equal to the length of the air gap divided by the area of the air gap. The intersection of the line and the demagnetization curve identifies the residual magnetic flux remaining when no current is provided to conductor 32. From this point, one can determine the amount of current required to generate a coercive magnetomotive force that is sufficient, when combined with the impact of the air gap, to overcome the residual attractive force between armature 16 and housing 30.

As described above, generation of current by controller 24 is used to move device 10 between a (fully) engaged position and a (fully) disengaged position. In some embodiments, however, it may be desirable to apply a partial braking torque to control the rate of motion in a rotating body. In these embodiments, controller 24 may be further configured to generate current pulses of alternating polarity at a relatively high frequency to produce a smaller braking torque. Controller 24 may generate these pulses in response to a set of programming instructions (i.e. software) stored in a memory, in response to sensor feedback (e.g., the speed of the rotating body, or position of armature 16 along axis 14) and/or in response to user commands entered through a conventional user interface.

Figure 2:
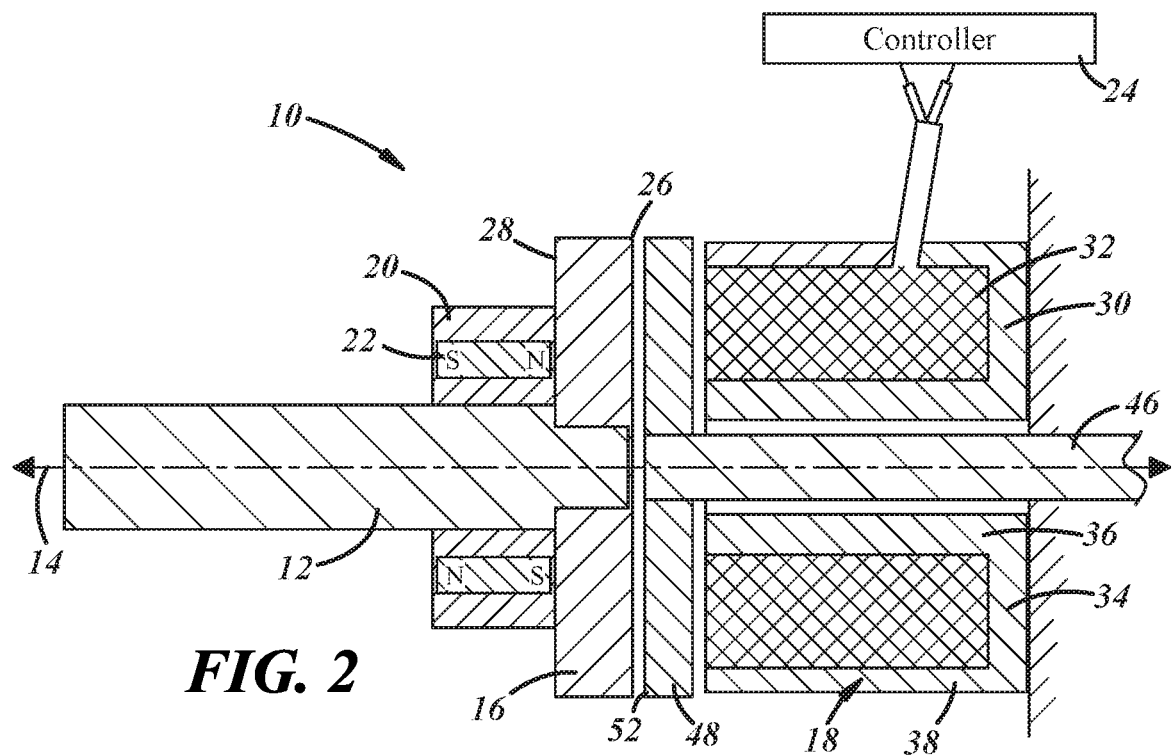
FIG. 2 is a diagrammatic, cross-sectional view of a rotational coupling device in accordance with another embodiment of the present invention.

Referring now to FIG. 2, a rotational coupling device 44 in accordance with another embodiment of the invention is illustrated. Device 44 is configured to function as a clutch. It will be understood by those of ordinary skill in the art that device 44 may be used in a wide variety of industrial and other applications requiring a clutch. Device 44 selectively transmits torque between shaft 12 and a shaft 46. Shaft 46 may be driven by a motor or another power source (it should be understood, however, that shaft 46 may alternatively be configured as a driven shaft with shaft 12 driven by a motor or other power source). In the illustrated embodiment, shaft 46 is configured to rotate about the same rotational axis 14 as shaft 12. Device 44 may include many of the same components as device 10 including armature 16, electromagnet assembly 18, collar 20, magnets 22 and a description of these components may be found above. Device 44 differs from device 10 in that device 44 may further include a rotor 48 coupled to shaft 46 and a controller 50 configured to control the operation or device 44.

Rotor 48 is provided to transmit torque between shaft 46 and armature 16 and, consequently, shaft 14. Rotor 48 may be made from metals or metal alloys or other materials having relatively low magnetic reluctance such as iron or steel. In accordance with various embodiments, rotor 48 is made from metal alloys having a relatively high carbon content such that that rotor 48 has a relatively high remanence following exposure to electromagnetic fields. In accordance with certain embodiments, rotor 48 is made from a material having a content of at least 0.35 percent by weight of carbon or a carbon equivalent. Rotor 48 may be annular in shape and may be disposed about, and centered about, axis 14. Rotor 48 is disposed axially between armature 16 and electromagnet assembly 18. Rotor 48 is coupled to shaft 46 for rotation therewith. In particular, the radially outer surface of shaft 46 and the radially inner surface of rotor 48 may have complementary, torque transmitting, shapes that fix rotor 48 to shaft 46 against relative rotation. Rotor 48 may further be fixed against axial movement relative to shaft 46 through the use of fasteners such as screws, welds or adhesives or through the use of snap rings or similar devices on either side of rotor 48. Rotor 48 includes a friction surface 52 configured to engage friction surface 26 on armature 16 during engagement of the clutch.

Controller 50 is provided to control the delivery of current to conductor 32 and, therefore, the operation of device 44. Controller 50 may again comprise a programmable microprocessor or microcontroller or may comprise an application specific integrated circuit (ASIC). Controller 50 may include a central processing unit (CPU). Controller 50 may also include a memory and an input/output (I/O) interface through which controller 50 may receive a plurality of input signals and transmit a plurality of output signals. Controller 50 controls the delivery of current to conductor 32 from a power source (not shown) such as a battery or capacitor.

Controller 50 is configured to control the operation of device 44 by controlling the delivery of current to conductor 32 in order to apply and release the clutch. In some embodiments, current may be delivered to conductor 32 continuously or for relatively long durations to engage the clutch and maintain the clutch in an engaged state. In other embodiments, device 44 may operate as a bistable clutch in which short duration current pulses cause device 44 to move between engaged and disengaged states and to remain in a given state after the pulse ends until the next current pulse is provided to conductor 32. When device 44 is disengaged (i.e., when armature 16 is disengaged from rotor 48 as a result of the magnetic forces generated by magnets 22), controller 50 may engage the clutch by delivering current having a first polarity to conductor 32. The current establishes an electromagnetic circuit including armature 16, housing 30, and rotor 48. In particular, the current generates a magnetomotive force in an amount equal to the number of turns (N) in the conductor 32 multiplied by the amount of current (I). The magnetomotive force generates a magnetic flux ($\phi$) that traverses the air gaps between rotor 48 and housing 30 and between rotor 48 and armature 16 with the amount of flux ($\phi$) depending on the magnetic reluctance (R) in the electromagnetic circuit. The flux ($\phi$) in the electromagnetic circuit creates an attractive force (F) between the armature 16, rotor 48 and housing 30 opposing the magnetic forces of magnets 22 and that is a combination of forces at the inner and outer poles formed by walls 36, 38 of housing 30: F=$\phi^2$/(area of outer pole)+$\phi^2$/(area of inner pole). The amount of current (I) supplied must be sufficient to generate an attractive force (F) greater than the magnetic force of magnets 22 in order to urge armature 16 in an axial direction away from collar 20 and towards rotor 48 to engage the clutch.

As noted above, in some embodiments device 10 may be configured to act as a bistable clutch in which device 44 is configured to maintain an attractive force (F) that exceeds the magnetic force of magnets 22 even after the current is terminated. As discussed above, at least one of armature 16 and rotor 48 may be made from a material having a relatively high carbon content. As a result, the armature 16 and rotor 48 have a relatively high remanence that continues to exist even after current is no longer provided to conductor 32. Due to this remanence, a magnetic circuit among armature 16 and rotor 48 is maintained after termination of the current and the clutch remains in an engaged or applied state. In one embodiment, at least one of armature 16 and rotor 48 has a content of at least 0.35 percent by weight of carbon or a carbon equivalent so as to have a relatively high remanence. The exact material composition of armature 16 and/or rotor 48 may vary, however, based on other factors that influence the amount of attractive force between armature 16 and rotor 48 such as the size of the air gap between armature 16 and rotor 48 when the clutch is disengaged. Further, the material composition may be chosen in consideration with other factors that influence residual magnetism including annealing, mechanical stresses (e.g., coining) and heat treatment of materials. In general, the material for armature 16 and/or rotor 48 is selected so as to produce a residual attractive force between armature 16 and rotor 48 that exceeds the magnetic force of magnets 22 when considering these other factors.

When it is desired to disengage or release the clutch, controller 50 may simply terminate delivery of the current to conductor 32. Alternatively, in the case of the bi-stable clutch wherein the armature 16, housing 30 and/or rotor 48 have a relatively high remanence, controller 50 may provide current to conductor 32 having a polarity that is opposite the polarity of the current used to engage device 44. The current again generates a magnetomotive force in an amount equal to the number of turns (N) in the conductor 32 multiplied by the amount of current (I), but this magnetomotive force operates in a direction opposite the force generated by the current used to engage device 44. This coercive magnetomotive force reduces the residual magnetic flux (φ) traversing the air gap between the armature 16 and rotor 48. As a result, the current weakens the magnetic circuit among armature 16 and rotor 48 thereby allowing magnets 22 to move armature 16 along axis 14 away from rotor 48 and electromagnet assembly 18 and towards collar 20 to disengage device 44. Because the magnetic force of magnets 22 moves armature 16 during disengagement of device 44, the current used to disengage device 44 may have a magnitude that is less than the magnitude of the current used to engage device 44 (in which the force exerted by magnets 22 must be overcome). Further, the amount of current required to disengage or release device 44 may be minimized by considering the size of the air gap between armature 16 and rotor 48. In particular, the existence of the air gap also opposes the residual attractive force between armature 16 and rotor 48. In a graph of a conventional demagnetization curve, an air gap line can be plotted in the second quadrant of the graph from the origin and with a slope equal to the length of the air gap divided by the area of the air gap. The intersection of the line and the demagnetization curve identifies the residual magnetic flux remaining when no current is provided to conductor 32. From this point, one can determine the amount of current required to generate a coercive magnetomotive force that is sufficient, when combined with the impact of the air gap, to overcome the residual attractive force between armature 16 and rotor 48.

As described above, generation of current by controller 50 is used to move device 44 between a (fully) engaged position and a (fully) disengaged position. In some embodiments, however, it may be desirable to apply a partial torque to control the rate of motion in a rotating body. In these embodiments, controller 50 may be further configured to generate current pulses of alternating polarity at a relatively high frequency to produce a smaller torque. Controller 50 may generate these pulses in response to a set of programming instructions (i.e. software) stored in a memory, in response to sensor feedback (e.g., the speed of the rotating body, or position of armature 16 along axis 14) and/or in response to user commands entered through a conventional user interface.

A rotational coupling device 10 or 44 in accordance with the present teachings is advantageous relative to conventional rotational coupling devices. In particular, the inventive device 10 or 44 releases an armature 16 mounted on a shaft 14 from engagement with a stationary or rotating member 30 or 48, respectively, using a collar 20 with one or more permanent magnets 22 that is mounted on the same shaft 14. The collar 20 and magnets 22 cause a rapid release of the armature 16 that overcomes the residual magnetism in the armature 16 and stationary or rotating member 30 or 48, respectively, to reduce the release time and friction between the armature 16 and member 30 or 48. The collar 20 also eliminates the need for springs or other axial mechanical force transmitting mechanisms thereby reducing the number of moving parts in the coupling device and improving the life of the device.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
   an armature having a shape that is complementary to a shape of a shaft such that the armature is configured for directly coupling to the shaft for rotation therewith about a rotational axis and for movement axially relative to the shaft;
   an electromagnet assembly disposed on a first axial side of the armature and fixed against rotation relative to the rotational axis; and,
   a collar disposed on a second axial side of the armature opposite the electromagnet assembly, the collar configured for rotation with the shaft, but fixed against axial movement relative to the shaft, the collar housing a first permanent magnet
   wherein the electromagnet assembly urges the armature in a first axial direction to disengage the armature from the collar and urge the armature into engagement with a member of the coupling device to transmit a torque between the member and the armature when a current having a first polarity is provided to the electromagnet assembly and the first permanent magnet urges the armature in a second axial direction to disengage the armature from the member when the current is not provided to the electromagnet assembly
   wherein the member of the coupling device comprises the electromagnet assembly and the torque brakes rotation of the armature.

2. The rotational coupling device of claim 1 wherein the collar houses a second permanent magnet, a pole of the first permanent magnet having a first magnet polarity facing the armature and a pole of the second permanent magnet having the first magnet polarity facing away from the armature.

3. A rotational coupling device, comprising:
   an armature having a shape that is complementary to a shape of a shaft such that the armature is configured for directly coupling to the shaft for rotation therewith about a rotational axis and for movement axially relative to the shaft;
   an electromagnet assembly disposed on a first axial side of the armature and fixed against rotation relative to the rotational axis; and,
   a collar disposed on a second axial side of the armature opposite the electromagnet assembly, the collar configured for rotation with the shaft, but fixed against axial movement relative to the shaft, the collar housing a first permanent magnet
   a controller configured to
   provide a current having a first polarity to the electromagnet assembly to establish an electromagnetic circuit between the armature and the electromagnet assembly to disengage the armature from the collar and urge the armature in a first axial direction into engagement with a member of the coupling device to transmit a torque between the member and the armature; and
   terminate the current to terminate the electromagnetic circuit between the armature and the electromagnet assembly, the first permanent magnet urging the armature in a second axial direction following termination of the electromagnetic circuit to disengage the armature from the member
   wherein the member of the coupling device comprises the electromagnet assembly and the torque brakes rotation of the armature.

4. The rotational coupling device of claim 3 wherein the collar houses a second permanent magnet, a pole of the first permanent magnet having a first magnet polarity facing the armature and a pole of the second permanent magnet having the first magnet polarity facing away from the armature.

5. A rotational coupling device, comprising:

an armature having a shape that is complementary to a shape of a shaft such that the armature is configured for directly coupling to the shaft for rotation therewith about a rotational axis and for movement axially relative to the shaft;

an electromagnet assembly disposed on a first axial side of the armature and fixed against rotation relative to the rotational axis; and, a collar disposed on a second axial side of the armature opposite the electromagnet assembly, the collar configured for rotation with the shaft, but fixed against axial movement relative to the shaft, the collar housing a first permanent magnet wherein the electromagnet assembly urges the armature in a first axial direction to disengage the armature from the collar and urge the armature into engagement with a member of the coupling device to transmit a torque between the member and the armature when a first current having a first polarity is provided to the electromagnet assembly and the first permanent magnet urges the armature in a second axial direction to disengage the armature from the member when a second current having a second polarity is provided to the electromagnet assembly.

6. The rotational coupling device of claim 5, further comprising a controller configured to provide the first current and the second current to the electromagnet assembly.

7. The rotational coupling device of claim 5 wherein at least one of the armature and the member of the coupling device has a content of at least 0.35 percent by weight of carbon or a carbon equivalent.

8. The rotational coupling device of claim 7 wherein both of the armature and the member of the coupling device have a content of at least 0.35 percent by weight of carbon or a carbon equivalent.

9. The rotational coupling device of claim 5 wherein the armature remains engaged with the member after termination of the first current having the first polarity until the second current having the second polarity is provided to the electromagnet assembly.

10. The rotational coupling device of claim 5 wherein the armature remains engaged with the collar after termination of the second current having the second polarity and until the first current having the first polarity is provided to the electromagnet assembly.

11. The rotational coupling device of claim 5 wherein a magnitude of the second current is less than a magnitude of the first current.

12. The rotational coupling device of claim 5 wherein a magnetic circuit including the armature and the member is maintained after termination of the first current due to a remanence in at least one of the armature and the member, the magnetic circuit generating an attractive force greater than a magnetic force of the first permanent magnet, and the second current weakens the magnetic circuit such that the attractive force of the of the magnetic circuit is less than the magnetic force of the first permanent magnet.

* * * * *